R. WELLS.
METHOD OF EXTRACTING VALUES FROM GARBAGE AND THE LIKE.
APPLICATION FILED NOV. 13, 1916.
1,307,991.
Patented June 24, 1919.
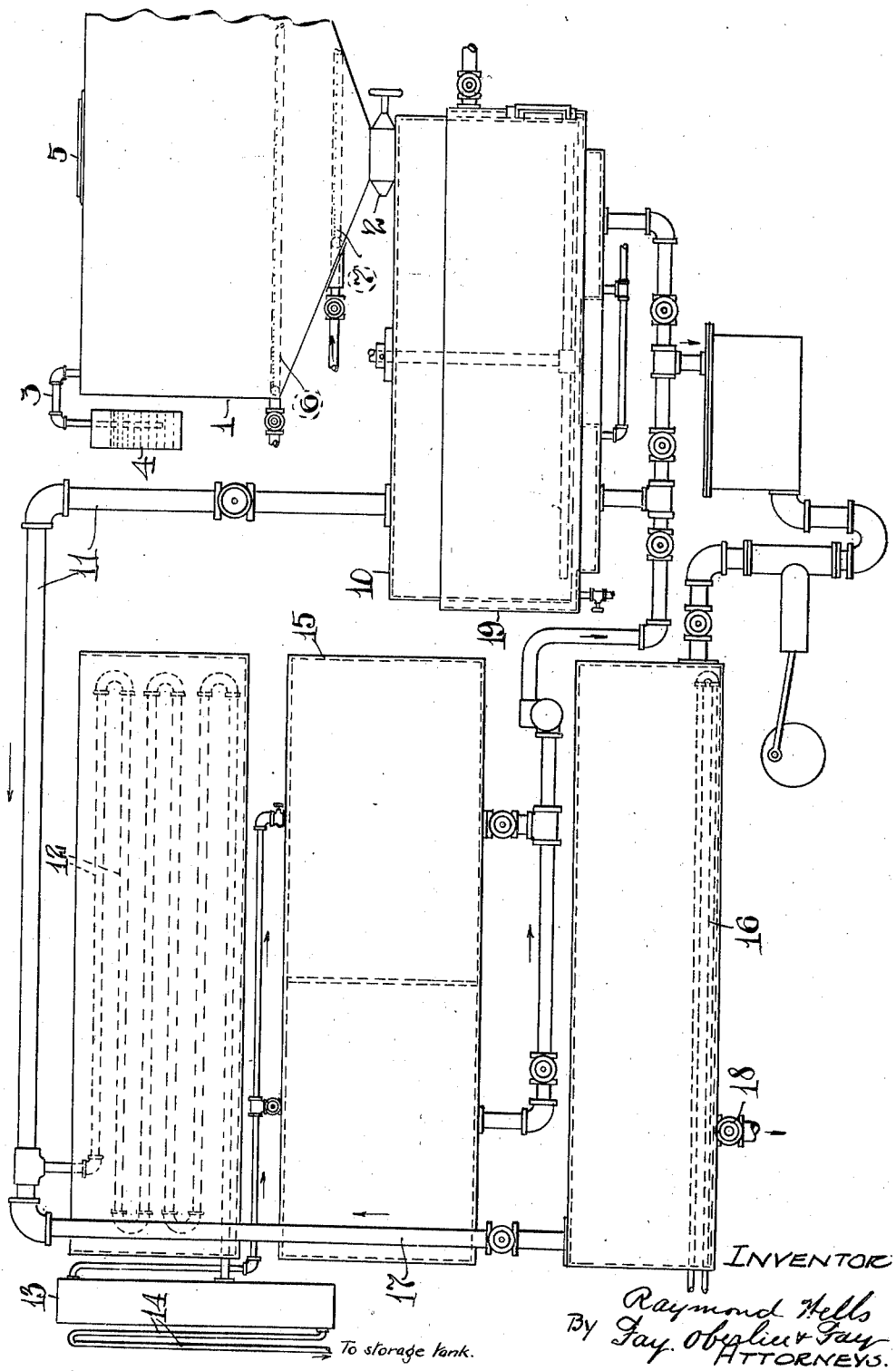

UNITED STATES PATENT OFFICE.

RAYMOND WELLS, OF HOMER, NEW YORK, ASSIGNOR TO COBWELL CORPORATION, OF CLEVELAND, OHIO, A CORPORATION OF VIRGINIA.

METHOD OF EXTRACTING VALUES FROM GARBAGE AND THE LIKE.

1,307,991.   Specification of Letters Patent.   Patented June 24, 1919.

Application filed November 13, 1916. Serial No. 130,952.

*To all whom it may concern:*

Be it known that I, RAYMOND WELLS, a citizen of the United States, and a resident of Homer, county of Cortland, and State of New York, have invented a new and useful Improvement in Methods of Extracting Values from Garbage and the like, of which the following is a specification, the principle of the invention being herein explained and the best mode in which I have contemplated applying that principle, so as to distinguish it from other inventions.

In my co-pending application, filed March 11, 1915, Serial No. 13,718, (now Patent No. 1,267,611, dated May 28, 1918) I describe a method of extracting oils and the like that is particularly adapted to the rendering, drying and disposal of materials, in which the oils, greases or the like to be extracted are found in conjunction with a smaller or larger amount of water. Among other materials, for the treatment of which the process in question is thus particularly adapted, is municipal garbage, and such process has already been extensively developed in a commercial way along this line. In the treatment, however, of the material just named other values are found, in addition to the oils, greases or fats, and particularly starches, gums and sugars, which are lost in the method of treatment described in my co-pending application, and in any other method of treatment in so far as I am aware, that has heretofore been attempted for recovering oils and the like from such materials.

The present improved process has as its object the provision of a simple and economical method of recovering the values in the form of sugars, gums and starches without interfering with the subsequent recovery of the oils and greases. In fact as a result of the treatment, to which the material is subjected for the recovery of the first-named valuable products, the extraction or recovery of the last-named products is greatly facilitated and the combined process presents numerous and important advantages over any method of garbage-disposal heretofore disclosed. To the accomplishment of the foregoing and related ends, the invention, then, consists of the means hereinafter described and particularly pointed out in the claims.

The annexed drawing and the following description set forth in detail one approved method of carrying out the invention, such disclosed mode constituting, however, but one of various ways in which the principle of the invention may be used.

In said annexed drawing:—

The single figure there appearing is a side elevational view, more or less diagrammatic, of apparatus for carrying out my improved process or method.

In carrying out such process or method the material to be treated, for example municipal garbage, as aforesaid, is upon arrival at the plant picked over as usual for the removal of tin cans, rags and similar refuse, without, however, any greater care being exercised than is usual. Thereupon such material is placed in large tanks preferably of light steel construction, and capable of being tightly closed. In the drawing, only one such tank 1 is illustrated; the number of such tanks, however, will of course depend upon the capacity of the plant, and their size may be varied to comport with the size of the associated reduction tank. Preferably these tanks a.e of general cylindrical form, of a diameter two and one half times the height of the straight sides, and have conical bottoms with valves 2 of adequate size forming the bottom outlets. The top of each tank has a vapor outlet 3, which leads to a small condenser 4 for the condensation of odors, and is further provided with a man-hole 5 for filling. The latter, however, can, as indicated, be tightly closed. The tanks are furthermore provided interiorly with a perforated steam coil 6, which should be of considerable size, so that the mass may be heated as speedily as possible, and also with another perforated pipe 7 for the addition of malt infusion and yeast, at appropriate times.

As soon as a tank has been filled to the proper level, live steam is admitted through the steam coil 6, and the material raised to the boiling point, and there kept for several hours. The object of this treatment is to rupture the starch cells, and cause the starches, gums and sugars to go into solution. Contrary to the usual method of procedure in the decoction of grains and potatoes, it has been found unnecessary to digest the material under steam pressure, in order thus to liberate the starch; this possibly being due to the fact that free organic acids are present in the mass in considerable quantity and may assist in the processing.

After being cooked for a sufficient time, the mass is allowed to stand and cool to approximately 150° F., further digestion taking place during this period of cooling, so that by the time the saccharizing temperature (140° F.) is reached, the major portion of the starch is liberated, or in such condition that the diastase of the malt can readily act upon it and convert it into sugars and dextrin. When the indicated saccharizing temperature is reached, 0.5 per cent. by weight of ground malt is fed, in the form of an infusion in water, through the pipe 7, steam being at the same time turned on momentarily through the steam coil 6, in order to agitate and mix such malt with the mass of cooked material. Cooling of the latter is thereupon allowed to continue until a temperature of approximately 90° F. is reached, the period required for such cooling being sufficient for the conversion of the starches into sugar and dextrin by the malt, as may be determined by the familiar iodin test.

At this stage yeast is added to the mass through the same pipe 7, through which the malt was fed, such yeast being added in the proportion of five pounds of yeast to one ton of garbage in the original loading, or mass. Fermentation will ordinarily start in about two hours, and may be properly allowed to proceed for from thirty to forty hours. During such fermentation, the gases, which are given off, are discharged through the vent pipe 3 and washed free of any disagreeable odor by the condenser 4. At the end of the fermentation period, the original mass of course, rough garbage, has been broken up by the cooking, saccharizing and fermentation into a semi-liquid mass of fiber mixed with a thin watery solution of alcohol, acetic acid and soluble organic and inorganic substances, not acted upon by yeast.

Such fermented mass is next treated for the recovery of the oils, greases and the like, which obviously constitute ingredients not acted upon by the preceding treatment, including the fermentation step last described.

Preliminarily, as in my co-pending application, the removal of the water is first accomplished, the mass being passed into a suitable chamber 10, and there dehydrated by mixing therewith a medium insoluble in water but capable of dissolving the oil or other like ingredient to be extracted, raising the temperature of the mixture to a point where the combined vapor tensions of such solvent and water are equal to or greater than the vapor pressure in the chamber in which the treatment is carried on, thereupon simultaneously evaporating the water with such medium, and adding more of such medium so as to maintain the body thereof substantially constant. As stated in such co-pending application, I may use, as the medium in question, certain volatile distillates of petroleum and coal tar, such as naphtha, as well as the chlorinated products of methane, ethane and ethylene, such as carbon tetrachlorid for example. The alcohol, being of course in solution in the water, is driven off along therewith, so that the vapors passing over from the dehydrating chamber 10 are composed of solvent, water and alcohol. These pass, by way of pipe 11, through a suitable condenser 12 to a separating tank 13, where the alcoholic water settles to the bottom, while the solvent flows out at the top, such water being drawn off through the pipe 14 to a suitable storage tank, not shown. As a rule the first runnings of effluent water will contain from 8 to 9 per cent. of alcohol gradually growing weaker toward the end of this step in the general process, until at the end such water will not contain over 1.5 per cent. of alcohol. The average alcoholic content, however, for the total effluent or wash, is 4 or 5 per cent., by weight.

When it is found that the water is substantially entirely driven off, the connections between the chamber and the condenser 12 and the double storage tank 15, from which the solvent is supplied to such chamber, are closed, and the body of solvent in the latter is withdrawn into the still 16. Such body of solvent will carry with it the major portion of the oil, grease or like ingredient to be extracted, and is separated from the latter in the still by being boiled off, the solvent vapors being carried to the condenser 12 by pipe 17, and thence returned to the storage tank 15, as will be readily understood.

Thereupon the connections between the chamber 10 and still 16 are closed, and a supply of solvent from the storage tank is admitted into the chamber, there mixed with the residual material, and then withdrawn again to the still, dissolving, or washing out, incidentally a further portion of the oils or grease in such material. The latter may be subjected to as many successive washings as is found desirable, until in the end practically all of the oil or grease therein has been extracted, the solvent being distilled off as desired, condensed and returned to the storage tank, so as to be used over and over again. The oil or grease that collects in the still may be of course withdrawn whenever desired, through the discharge pipe 18, provided for the purpose.

The solvent, which may be absorbed in the residual material in the chamber, is recovered by supplying steam to the jacket 19 of the chamber 10 until a higher temperature than previously used is attained, sufficiently high so that, when live steam is thereupon introduced into the interior of the chamber, such steam is not condensed upon coming in contact with the material, but remains volatile, at the same time vaporizing the solvent in such material and carrying the same along into the condenser. The tankage that is left in the chamber contains all the chemical constituents of the garbage valuable as fertilizer that are found in the tankage derived from the process described in my aforesaid co-pending application. Since, however, a large quantity of starchy matter has been removed, the bulk and weight of such tankage is greatly reduced, so that the proportion of the valuable constituents therein is correspondingly increased.

The subsequent treatment of the alcoholic water or "wash," obtained incidentally to the dehydrating step, need not be described in detail. Such wash is rendered neutral with lime water and concentrated in any preferred type of alcoholic still; or, if desired, it need not be rectified and concentrated at all, but may be treated as vinegar liquid, and by suitable process converted into weak acetic acid and ultimately into acetate of lime, or acetone.

As heretofore indicated, a slight amount of acetic acid is formed incidentally to the fermentation step, although the tank 1 is kept tightly closed with the object of keeping the amount of such acid down to a minimum. Where, however, the ultimate product desired in this connection is acetic acid, the formation of such acid in the tank in question instead of being thus hindered, may be purposely brought about, by well understood methods. In other words, by introducing a sufficient quantity of "mother of vinegar" and allowing the air to have access to the contents of the tank, the fermentation may be carried on to the further step, where acetic acid and not simply alcohol is produced. In such event, the acid will be driven off along with the water in the dehydration step, just as in the case of the alcohol.

It will accordingly be understood that wherever alcohol is referred to as the product of the fermentation step in the present process, such term is to be understood as including alcoholic derivatives such as acetic acid, even where the latter are not expressly referred to.

By my improved process without any particular increase in complication, or labor in handling the material being treated, I am enabled to effect the recovery of much larger values from garbage than has heretofore been possible, inasmuch as the conversion of the sugars, starches and gums into alcohol produces from ten to fifteen gallons of the latter per ton. Not only have these ingredients heretofore been lost, but they have constituted a positive detriment to the recovery of the oils and the like, producing a "pasty condition" of the garbage prior to treatment in the reducers, and preventing the rapid dehydration of such material. By my present process, accordingly, a very large saving in steam, as well as of time, results from the improved, more workable condition of the material, and a smaller number of reducers will consequently serve to handle a given amount of the material.

It has been previously pointed out that the residue, or tankage, is not only greatly reduced in bulk, but that the valuable chemicals therein are correspondingly concentrated. The decrease in the amount of such residue left after the dehydration step, obviously facilitates the extraction of the grease therefrom in the washing step, requiring less solvent, less time for operation, and less steam for heating. At the same time the yield of oil and grease is increased, for the tankage always retains a certain amount thereof, which cannot be economically washed out, and since such tankage is approximately only one half as much, this loss is likewise halved. The grease recovered from the material after the starches, etc., have been converted and distilled off, is likewise found to be free from the objectionable color due to the presence of organic matter which has heretofore been characteristic of grease derived from this source and the value of such grease is accordingly enhanced.

Other modes of applying the principle of my invention may be employed instead of the one explained, change being made as regards the steps herein disclosed, provided the steps stated by any of the following claims or the equivalent of such stated steps be employed.

I therefore particularly point out and distinctly claim as my invention:—

1. In a method of recovering values from garbage, the steps which consist in fermenting the starches, sugars and gums therein, in the original mass without removing therefrom the oils, greases or fats also present; and then driving off and separately collecting the water with alcohol thus produced, leaving such oils, greases or fats behind.

2. In a method of recovering values from garbage, the steps which consist in cooking the original mass without removing therefrom the oils, greases or fats also present; thereupon saccharizing the same and adding a suitable yeast, whereby the starches, sugars and gums therein are converted into alcohol, or derivatives thereof; and then driving off and separately collecting the water with alcohol thus produced, leaving such oils, greases or fats behind.

3. In a method of recovering values from garbage and like materials containing starches, sugars or gums as well as oils, greases, or fats, the steps which consist in fermenting such first-named ingredients in the original mass; driving off the water with alcohol thus produced; and then extracting such last-named ingredients from the residual mass.

4. In a method of recovering values from garbage and like materials containing starches, sugars or gums as well as oils, greases, or fats, the steps which consist in cooking the original mass; thereupon saccharizing the same and adding a suitable yeast, whereby such first-named ingredients are converted into alcohol, or derivatives thereof; driving off the water with alcohol thus produced; and then extracting such last-named ingredients from the residual mass.

5. In a method of recovering values from garbage and like materials containing starches, sugars or gums, as well as oils, greases, or fats, the steps which consist in fermenting such first-named ingredients in the original mass; mixing the fermented mass with a medium insoluble in water but capable of dissolving such last-named ingredients; and raising the temperature to a point where the combined vapor tensions of such medium and water, with alcohol in solution, are equal to or greater than the superimposed vapor pressure, thereby simultaneously evaporating such water and alcohol along with such medium.

6. In a method of recovering values from garbage and like materials containing starches, sugars or gums, as well as oils, greases, or fats, the steps which consist in fermenting such first-named ingredients in the original mass; mixing the fermented mass with a medium insoluble in water but capable of dissolving such last-named ingredients; raising the temperature to a point where the combined vapor tensions of such medium and water, with alcohol in solution, are equal to or greater than the superimposed vapor pressure, thereby simultaneously evaporating such water and alcohol along with such medium; and adding more of the latter as the evaporation proceeds.

7. In a method of recovering values from garbage and like materials containing starches, sugars or gums, as well as oils, greases, or fats, the steps which consist in fermenting such first-named ingredients in the original mass; mixing the fermented mass with a medium insoluble in water but capable of dissolving such last-named ingredients; raising the temperature to a point where the combined vapor tensions of such medium and water, with alcohol in solution, are equal to or greater than the superimposed vapor pressure, thereby simultaneously evaporating such water and alcohol along with such medium; adding more of the latter, so as to maintain the body thereof substantially constant; and then drawing off the body of such medium with dissolved content of such last-named ingredients, after the water has been substantially all evaporated.

8. In a method of recovering values from garbage and like materials containing starches, sugars or gums, as well as oils, greases, or fats, the steps which consist in fermenting such first-named ingredients in the original mass; mixing the fermented mass with a medium insoluble in water but capable of dissolving such last-named ingredients; raising the temperature to a point where the combined vapor tensions of such medium and water, with alcohol in solution, are equal to or greater than the superimposed vapor pressure, thereby simultaneously evaporating such water and alcohol along with such medium; adding more of the latter, so as to maintain the body thereof substantially constant; drawing off the body of such medium with dissolved content of such last-named ingredients, after the water has been substantially all evaporated; and then washing the residual material with more solvent medium to extract any of such last-named ingredients still remaining therein.

9. In a method of recovering values from garbage and like materials containing starches, sugars or gums, as well as oils, greases, or fats, the steps which consist in boiling the original mass for several hours; cooling such mass to approximately 140 degrees F.; intermixing a malt infusion therewith and allowing same to cool further to approximately 90 degrees F.; thereupon intermixing a quantity of suitable yeast, whereby such first-named ingredients are converted into alcohol, or derivatives thereof; driving off and separately collecting the water with alcohol thus produced; and then extracting such last-named ingredients from the residual mass.

10. In a method of recovering values from garbage and like materials containing starches, sugars or gums, as well as oils, greases, or fats, the steps which consist in boiling the original mass for several hours; cooling such mass to approximately 140 degrees F.; intermixing a malt infusion therewith and allowing same to cool further to approximately 90 degrees F.; thereupon intermixing a quantity of suitable yeast, whereby such first-named ingredients are converted into alcohol, or derivatives thereof; mixing the resulting fermented mass with a medium insoluble in water but capable of dissolving such last-named ingredients; raising the temperature to a point where the combined vapor tensions of such medium and water, with alcohol in solution, are equal to or greater than the superimposed vapor pressure, thereby simultaneously evaporating such water and alcohol along with such medium; adding more of the latter, so as to maintain the body thereof substantially constant; and then drawing off the body of such medium with dissolved content of such last-named ingredients.

11. The method of extracting the alcoholic values from a fermented watery mass, which consists in mixing such mass with a medium insoluble in water; and then raising the temperature to a point where the combined vapor tensions of such medium and water, with alcohol in solution, are equal to or greater than the superimposed vapor pressure, thereby simultaneously evaporating such water and alcohol along with such medium.

12. The method of extracting the alcoholic values from a fermented watery mass, which consists in mixing such mass with a medium insoluble in water; then raising the temperature to a point where the combined vapor tensions of such medium and water, with alcohol in solution, are equal to or greater than the superimposed vapor pressure, thereby simultaneously evaporating such water and alcohol along with such medium; and adding more of the latter as the evaporation proceeds.

Signed by me, this 8th day of November, 1916.

RAYMOND WELLS.